United States Patent
Ito et al.

(10) Patent No.: US 7,510,228 B2
(45) Date of Patent: Mar. 31, 2009

(54) SEATING APPARATUS FOR A VEHICLE

(75) Inventors: Sadao Ito, Anjo (JP); Hisao Kiyota, Okazaki (JP); Yoshitaka Tomonari, Toyota (JP)

(73) Assignees: Aisin Seiki Kabushiki Kaisha, Kariya-shi (JP); Toyota Boshoku Kabushiki Kaisha, Kariya-shi (JP)

( * ) Notice: Subject to any disclaimer, the term of this patent is extended or adjusted under 35 U.S.C. 154(b) by 6 days.

(21) Appl. No.: 11/753,730

(22) Filed: May 25, 2007

(65) Prior Publication Data

US 2007/0273171 A1    Nov. 29, 2007

(30) Foreign Application Priority Data

May 26, 2006    (JP) .............................. 2006-146953

(51) Int. Cl.
 *B60N 2/22* (2006.01)
(52) U.S. Cl. .................................................. 296/65.17
(58) Field of Classification Search .... 296/65.16–65.18
 See application file for complete search history.

(56) References Cited

FOREIGN PATENT DOCUMENTS

| JP | 1-159742 | 11/1989 |
|---|---|---|
| JP | 6-59128 | 8/1994 |
| JP | 2002-345589 | 12/2002 |

*Primary Examiner*—Dennis H Pedder
(74) *Attorney, Agent, or Firm*—Oblon, Spivak, McClelland, Maier & Neustadt, P.C.

(57) ABSTRACT

A seating apparatus for a vehicle includes a seat cushion, a seat back pivotally connected to the seat cushion, a contacting member provided at the seat back, a receiving portion supporting the contacting member, the receiving portion including a parallel link mechanism having a fixed link member, a facing link member, first and second link members connecting the fixed link member to the facing link member, a long groove, a connecting axial portion sliding in the long groove when the seatback is moved, an adjustment mechanism adjusting an inclination of the seat back by positioning the facing link member to be close to, or be spaced away from, the fixed link member.

10 Claims, 4 Drawing Sheets

SEATING APPARATUS FOR A VEHICLE

CROSS REFERENCE TO RELATED APPLICATIONS

This application is based on and claims priority under 35 U.S.C §119 with respect to Japanese Patent Application 2006-146953, filed on May 26, 2006, the entire content of which is incorporated herein by reference.

FIELD OF THE INVENTION

The present invention relates to a seating apparatus for a vehicle. More particularly, the present invention relates to a seating apparatus for a vehicle in which a lower end portion of a seat back is pivotally connected to a rear end portion of a seat cushion, and contacting portions, which are provided at a backside of the seat back, are supported by receiving portions, which are provided at the vehicle body, so that the seat back reclines in conjunction with a forward movement of the seat cushion, which is positionally adjustable by moving in a forward and backward direction of the vehicle, and moves toward an upright position in conjunction with a backward movement of the seat cushion.

BACKGROUND

JP06-59128U discloses a known seating apparatus for a vehicle. The seating apparatus for the vehicle disclosed in JP06-59128U is provided with a seat cushion having a movable frame and a seat back. A front end side of the movable frame is supported by a base bracket of a base frame via a frame bracket and a link plate. The frame bracket is welded to the movable frame and the link plate is connected to the frame bracket. A rear end of the movable frame is supported by the guide bracket, which is secured to the base frame, via a roller bracket and a roller. The roller bracket is welded to the movable frame and the roller is mounted on the roller bracket. The base frame is fixed to a floor of the vehicle via a lock connected to a front portion of the base frame and a stay connected to a rear portion of the base frame.

The seat back is provided with a seat back main portion, which is fixed to a body, and a seat back movable portion. A movable frame is provided at the seat back movable portion. A lower end portion of the movable frame is connected with an interconnecting hinge provided at the movable frame of the seat cushion via a lower hinge pin. An upper end of the movable frame is connected to a hinge bracket included in a main portion frame, which is fixed to the seat back main portion, via a long hole and an upper hinge pin so as to be rotatable and slidable.

Further, a power seating apparatus mechanism including the link plate, a motor and the like is provided between the front end of the movable frame and the base plate mounted to the base frame. The power seating mechanism drives a spindle by means of the motor and operates the link plate for swinging around the link pin and moves the movable frame in the forward and backward direction by the link plate.

When the seat cushion is moved in the forward and backward direction, the lower end side of the seat back movable portion moves in the forward and backward direction via the interconnecting hinge, and the upper hinge pin slides within the long hole. Then, the seat back movable portion reclines or moves toward an upright position relative to the seat cushion in conjunction with the forward or backward movement of the seat cushion.

In the seating apparatus for the vehicle obtained based on a known technology, when a seat cushion is adjusted to a desired position by moving in the forward and backward direction, a seat back is set to a predetermined inclination depending on the adjusted position of the seat cushion. Inclination of the seat back is determined primarily by the position of the seat cushion. Thus, even if the seat cushion is adjusted to the desired position, depending on the body frame of the passenger, the seat back may recline or move toward an upright position more than desired position, forcing the passenger to be seated uncomfortably. Thus, the seat apparatus is not comfortably used sometimes.

The present invention has been made in view of the above circumstances, and provides a seating apparatus for a vehicle which is easy to use and changes an inclination of a seatback in conjunction with positioning adjustment of a seat cushion in a forward and backward direction.

SUMMARY OF THE INVENTION

According to an aspect of the present invention, a seating apparatus for a vehicle includes a seat cushion adapted to be adjusted to move in a forward and backward direction of a vehicle, a seat back pivotally connected, at a lower end portion thereof, to a rear end portion of the seat cushion for reclining in conjunction with a forward movement of the seat cushion and moving toward an upright position in conjunction with a backward movement of the seat cushion, a contacting member provided at a backside of the seat back, a receiving portion provided at a vehicle body and supporting the contacting member for reclining the seat back in conjunction with the forward movement of the seat cushion and moving the seat back toward an upright position in conjunction with the backward movement of the seat cushion, the receiving portion including a parallel link mechanism having a fixed link member fixed to the vehicle body, a facing link member facing the fixed link member, a first link member connecting the fixed link member to the facing link member, a second link member connecting the fixed link member to the facing link member, a long groove provided at one of the facing link member and the contacting member, a connecting axial portion provided at the other one of the facing link member and the contacting member and sliding in the long groove when the seatback is moved, an adjustment mechanism acting on the parallel link mechanism and adjusting an inclination of the seat back by positioning the facing link member to be close to, or to be spaced away from, the fixed link member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1A:
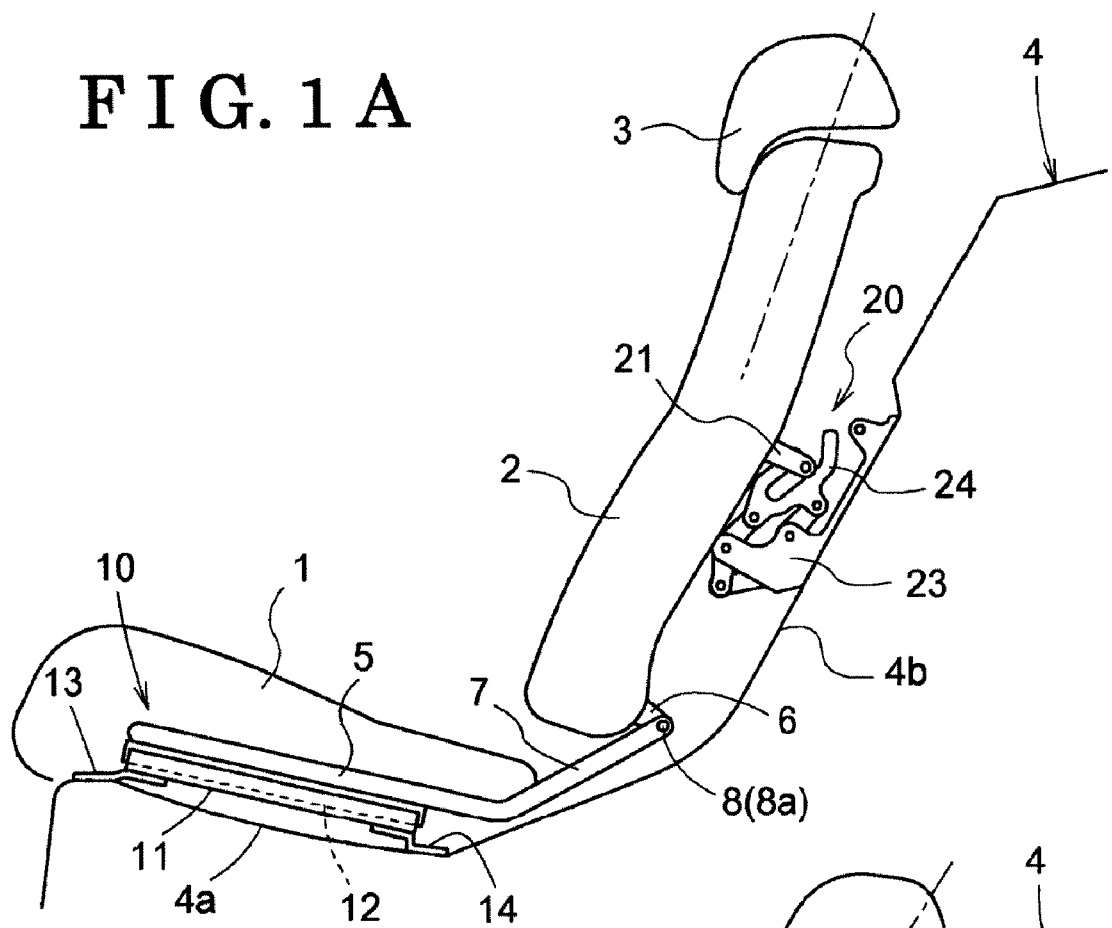
FIG. 1A is a side view of a seating apparatus for a vehicle in the condition where a seat cushion is adjusted to a most rear position relative to a vehicle body and FIG. 1B is a side view of the seating apparatus for the vehicle in the condition where the seat cushion is adjusted to a most front position relative to the vehicle body.

Embodiments of the present invention will be described below with reference to the attached drawings.

As illustrated in FIG. 1, a seating apparatus for a vehicle according to an embodiment of the invention is provided with a seat cushion 1, a seat back 2, and a headrest 3 which is attached to an upper end portion of the seat back 2. The seating apparatus for the vehicle is mounted on a panel 4 constructing a vehicle body via a lower supporting device 10 and a pair of left and right upper supporting devices 20. The lower supporting device 10 is located on a lower portion of the seat cushion 1 and the pair of left and right upper supporting devices 20 is located on a backside of the seat back 2.

As illustrated in FIG. 1, the lower supporting device 10 is provided with a base frame 11 which is connected to a lower portion 4a of the panel 4 and a slider 12 which is mounted to the seat cushion 1. The base frame 11 is fixed to the lower portion 4a of the panel 4 via a front bracket 13 and a rear bracket 14. The slider 12 is fixed to a seat frame 5 included in the seat cushion 1 and is also supported by the base frame 11 so as to be slidable in the forward and backward direction of the vehicle. The slider 12 is operated by a slide driving device (not shown) for sliding movement on the base frame 11 and is fixed in an adjusted position after the sliding movement is accomplished. The slide driving device is provided between the slider 12 and the base frame 11.

As illustrated in FIG. 1, a pair of left and right connecting brackets 6, which is fixed on the seat frame (not shown) included in the seat back 2, is provided at a lower end portion of the seat back 2. Each of the left and right connecting brackets 6 is pivotally connected to a corresponding connecting arm 7, which consists of a pair of left and right connecting arms 7, via a connecting pin 8. Each of the left and right connecting pins 8 has a pivot shaft center 8a and allows the seat back 2 to be moved by the seat cushion 1 which is movable in the forward and backward direction of the vehicle. The pivot shaft centers 8a are coaxially arranged each other and disposed laterally relative to the seating apparatus for the vehicle. Further, the left and right connecting pins 8 allow the seat back 2 to recline or to move toward an upright position relative to the seat cushion 1 with the pivot shaft center 8a serving as a supporting point. The pair of connecting arms 7 of the seat cushion 1 is integrally formed with the seat frame 5.

Figure 2:
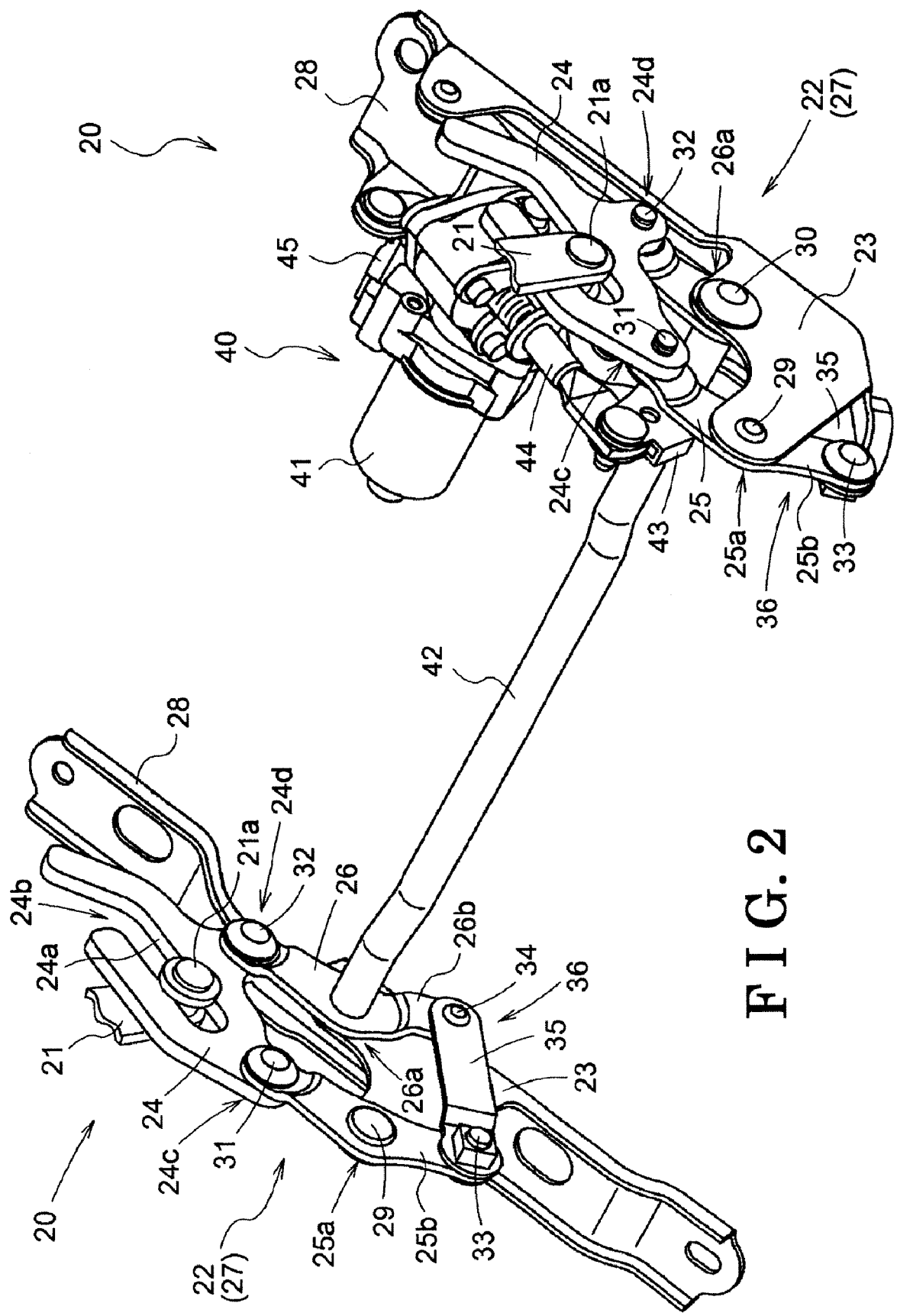
FIG. 2 is a perspective view of receiving portions.
Figure 3:
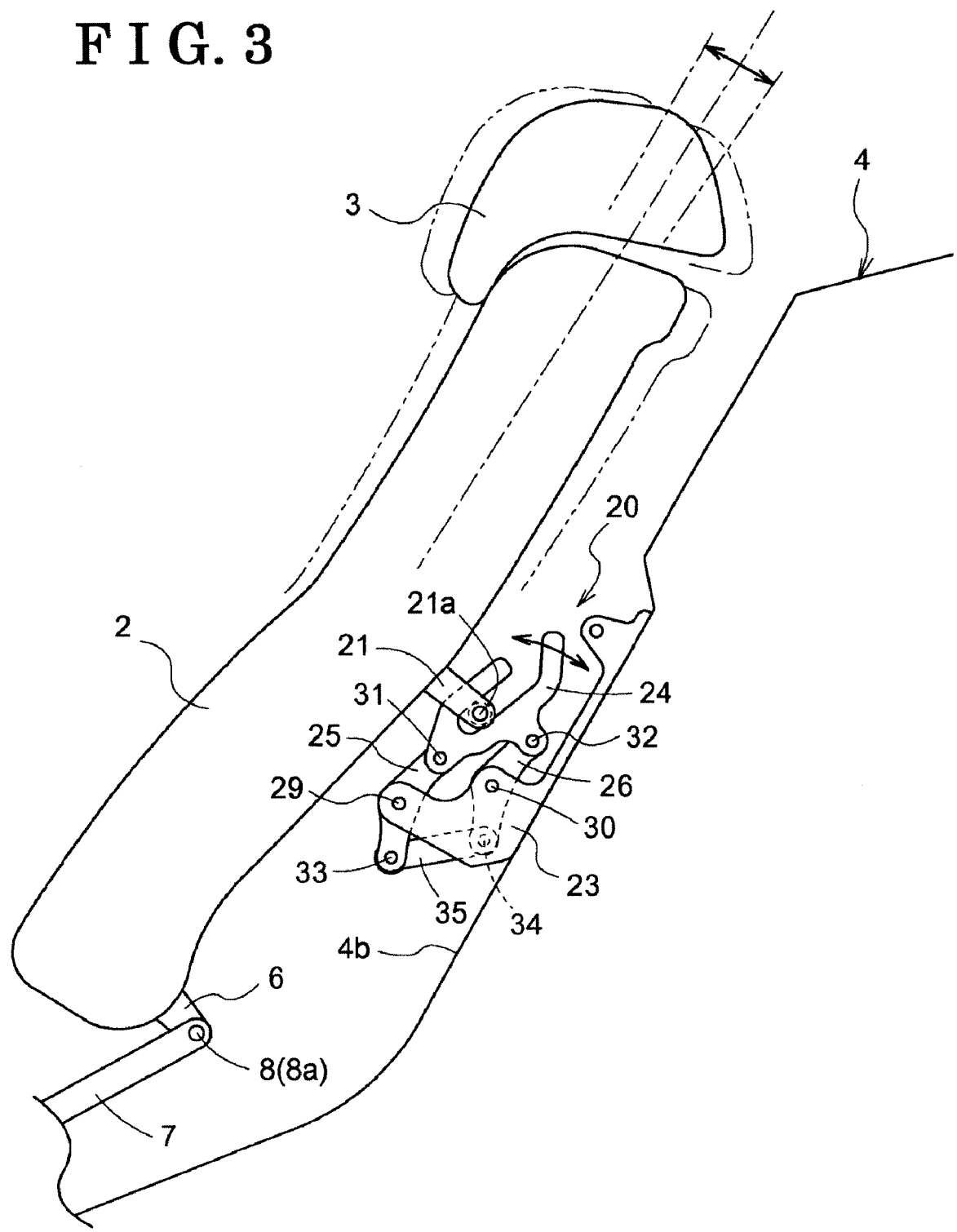
FIG. 3 is a side view of the receiving portion.

As illustrated in FIGS. 2 and 3, each of the left and right upper supporting devices 20 is provided with a contacting member 21 and a receiving portion 22. The contacting members 21 are provided on the backside of the seat back 2 and the receiving portions 22 are provided at the upper portion 4b of the panel 4 for acting as support of the contacting members 21.

The contacting members 21 are fixed to a seat frame (not shown) included in the seat back 2 and protrude from the backside of the seat back 2. A connecting axial portion 21a is provided at an extending end portion of each contacting member 21. The connecting axial portion 21a is configured by attaching a connecting pin to the contacting member 21 and is disposed in the upper side of the seat back 2 relative to the pivot shaft center 8a which is positioned at the lower end portion of the seat back 2.

As illustrated in FIGS. 2 and 3, each receiving portion 22 is composed by a parallel link mechanism 27 provided with a fixed link member 23, a facing link member 24, a first link member 25 and a second link member 26.

The fixed link member 23 is integrally formed with a base member 28, which is fixed to the upper portion 4b of the panel 4 by a connecting bolt, and fixed to the upper portion 4b of the panel 4 via the base member 28. In this case, the upper portion 4b of the panel 4 corresponds to the vehicle body. The facing link member 24 is disposed between the fixed link member 23 and the seat back 2 so as to face the fixed link member 23 and is connected to the fixed link member 23 by the first link member 25 and the second link member 26. The first and second link members 25 and 26 are pivotally connected to the fixed link member 23 via pivot axes 29 and 30, respectively. The pivot axes 29 and 30 are disposed laterally relative to the seating apparatus for the vehicle. Further, the first and second link members 25 and 26 are pivotally connected to the facing link member 24 via pivot axes 31 and 32 respectively so as to be relatively rotatable. The pivot axes 31 and 32 are arranged in parallel with the pivot axes 29 and 30.

A long hole 24a into which the connecting axial portion 21a of the contacting member 21 penetrates is provided at the facing link member 24. The long hole 24a allows the connecting axial portion 21a to move and swing slidably therein. The long hole 24a further allows the seat back 2 to be moved by the seat cushion 1, which is movable in the forward and backward direction of the vehicle, and allows the seat back 2 to move toward the upright position or recline with the pivot shaft center 8a serving as a pivotal supporting point. Also, the long hole 24a is provided with an opening 24b communicating with an exterior portion of the facing link member 24 at an end portion thereof located on the upper side relative to the seat back 2, and the opening 24b allows the connecting axial portion 21a to be fitted therein.

As illustrated in FIG. 2, an adjustment mechanism 40 provided with an electric motor 41 is supported by one of the pair of left and right base members 28, and is connected to the second link member 26 of each parallel link mechanism 27 to act on the pair of left and right parallel link mechanisms 27.

The adjustment mechanism 40 is provided with an operating shaft 42, an operating arm 43, and a decelerating mechanism 45 having the feed screw shaft 44 as well as the electric motor 41. The operation shaft 42 is connected to the second link members 26 of the left and right parallel link mechanisms 27. The operation arm 43 is connected to one end side of the operating shaft 42 so as to be unitarily rotatable with the operating shaft 42, and the feed screw shaft 44 is connected to one end of the operation arm 43.

The operating shaft 42 is connected to each second link member 26 and unitarily rotatable therewith via the rotatable pivot axis 30 which pivotally connects the second link member 26 to the fixed link member 23. The decelerating mechanism 45 inputs the driving force of the electric motor 41 to decelerate the driving force and operates the feed screw shaft to move backward and forward relative to a case of the decelerating mechanism 45 by the decelerated driving force.

Figure 4:
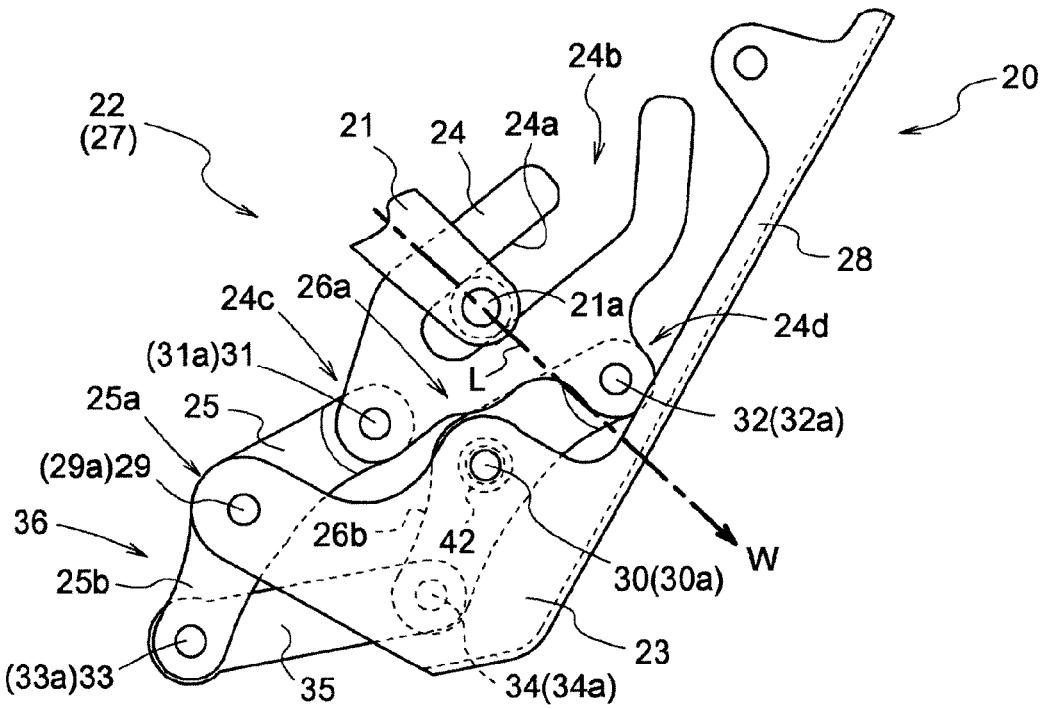
FIG. 4 is a side view of a parallel link mechanism in the condition where the seat back is adjusted to a stroke end for reclining.
Figure 5:
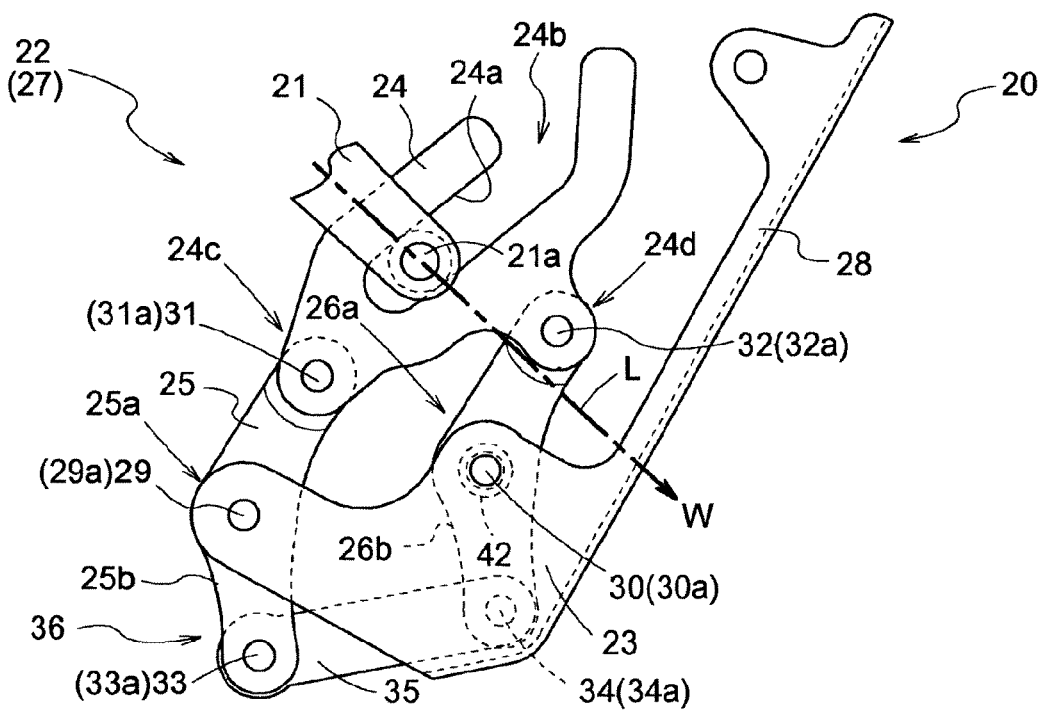
FIG. 5 is a side view of the parallel link mechanism in the condition where the seat back is adjusted to a stroke end for moving toward an upright position.

Namely, when the electric motor 41 is driven, the decelerating mechanism 45 operates the feed screw shaft 44 to move backward and forward by the driving force of the electric motor 41, and the feed screw shaft 44 swings the operating arm 43 around the center of the pivot axis 30 to swing the operating shaft 42. Consequently, as illustrated in FIGS. 4 and 5, the operating shaft 42 swings the respective second link members 26 of the pair of left and right parallel link mechanisms 27 in one or the other direction with respect to the fixed link member 23. FIG. 4 illustrates a state that the first link member 25 and the second link member 26 are swung to a stroke end for reclining the seat back 2. FIG. 5 illustrates a state that the first link member 25 and the second link member 26 are swung to a stroke end for moving the seat back 2 toward the upright position.

Thus, the adjustment mechanism 40 moves the facing link members 24 of the left and right parallel link mechanisms 27 by the driving force of the electric motor 41 so as to place each facing link member 24 close to the corresponding fixed member 23 or to space away the facing link member 24 from the corresponding fixed link member 23 and moves the upper end side of the seat back 2 around the pivot shaft center 8a in the forward and backward direction of the vehicle by way of the pair of left and right facing link members 24 via the pair of left and right contacting members 21. In FIG. 3, a neutral position of the seat back 2 is represented by a solid line and the upright position and the most reclined position of the seat back 2 is represented by a double dash line. As illustrated in the figure, the adjustment mechanism 40 adjusts an inclination of the seatback 2 relative to the seat cushion 1 in the direction for moving toward the upright position or for reclining.

As illustrated in FIGS. 2 and 4, a second parallel link mechanism 36 is disposed at each of the left and right receiving portions 22 and has the second facing link member 35 arranged so as to face the fixed link member 23.

Each second parallel link mechanism 36 is provided with extended portions 25b and 26b and the fixed link member 23 as well as the second facing link member 35. The extended portions 25b and 26b extend from connecting portions 25a and 26a, which connect the fixed link member 23 to the first link member 25 and the second link member 26 respectively, toward an opposite direction of the facing link member 24, respectively.

The second facing link member 35 is arranged at the opposite side, where the facing link member 24 exists, with respect to the fixed link member 23. The second facing link member 35 connects the extended portion 25b of the first link member 25 to the extended portion 26b of the second link member 26. Further, the second facing link member 35 is pivotally connected to the extended portion 25b of the first link member 25 and the extended portion 26b of the second link member 26 via the pivot axes 33 and 34 respectively so as to be rotatable.

The centers of pivot axes 31a and 32a respectively connect the first and second link members 25 and 26 to the facing link member 24. Likewise, the centers of pivot axes 29a, 30a respectively connect the first and second link members 25 and 26 to the fixed link member 23, and the centers of pivot axes 33a and 34a respectively connect the first and second link members 25 and 26 to the second facing link member 35. These centers of pivot axes 31a, 32a, 29a, 30a, 33a and 34a are arranged as illustrated in FIGS. 4 and 5. Namely, the centers of pivot axes 31a and 32a connecting to the facing link member 24, the centers of pivot axes 29a and 30a connecting to the fixed link member 23 and the centers of pivot axes 33a and 34a connecting to the second facing link member 35 are arranged to prevent from aligning on a single straight line of the centers of pivot axes 29a and 30a.

FIGS. 3, 4, and 5 show a state of the parallel link mechanism 27 in the condition where the seat cushion 1 is adjusted to the most front position relative to the vehicle body to which the seat cushion can be moved. FIG. 4 illustrates a state of the parallel link mechanism 27 in the condition where the seat cushion 1 is adjusted to the stroke end of the vehicle front side and the seat back 2 is adjusted to the stroke end of the reclined side. FIG. 5 illustrates a state of the parallel link mechanism 27 in the condition where the seat cushion 1 is adjusted to the stroke end of the vehicle front side and the seat back 2 is adjusted to the stroke end of the upright position side. In both figures, a line of action L is shown and the line L represents the line of action of the load W of the load applied to the seat back 2. The load W is applied to the receiving portion 22 from the connecting axial portion 21a of the contacting member 21.

Thus, when the seat cushion 1 is moved to the most front position relative to the vehicle body, the load W, which is applied to the receiving portion 22 from the connecting axial portion 21a of the contacting member 21, of the load applied to the seat back 2 is applied to the facing link member 24 along the line of action L. Each parallel link mechanism 27 is structured so that the line of action L is positioned between the center of pivot axis 31a and the center of pivot axis 32a in the condition where the seat cushion 1 is moved to the most front position relative to the vehicle body to which the seat cushion 1 can be moved. The centers of pivot axes 31a and 32a are located in the facing link member 24, specifically, the center of pivot axis 31a is in the pivoting portion 24c with the first link member 25 and the center of pivot axis 32a is in the pivoting portion 24d with the second link member 26.

In the seating apparatus for the vehicle, in order to use the seating apparatus, the slider 12 is moved by the slider driving apparatus relative to the base frame 11 and is fixed to a desired position. That is, the seat cushion is adjusted in the forward and backward direction of the vehicle to the desired position. When the seat cushion 1 is moved, the connecting pins 8 of the seat back 2, which connect the seat back 2 to the seat cushion 1, are moved along with the seat cushion 1 and the lower end portion of the seat back 2 is moved toward the moving direction of the seat cushion 1. At this timing, each connecting axial portion 21a of the left and right contacting members 21 located at the seat back 2 swings relative to the facing link member 24 and concurrently moves along the long hole 24a. This movement allows the seat back 2 to move toward the upright position or recline relative to the seat cushion 1 with the pivot shaft center 8a serving as a supporting point in conjunction with the movement of the seat cushion 1. Thus, the seat back 2 is positioned at an angle of the inclination according to the adjusted position of the seat cushion 1 in the condition where the seat cushion 1 is placed at the desired position.

Figure 1B:
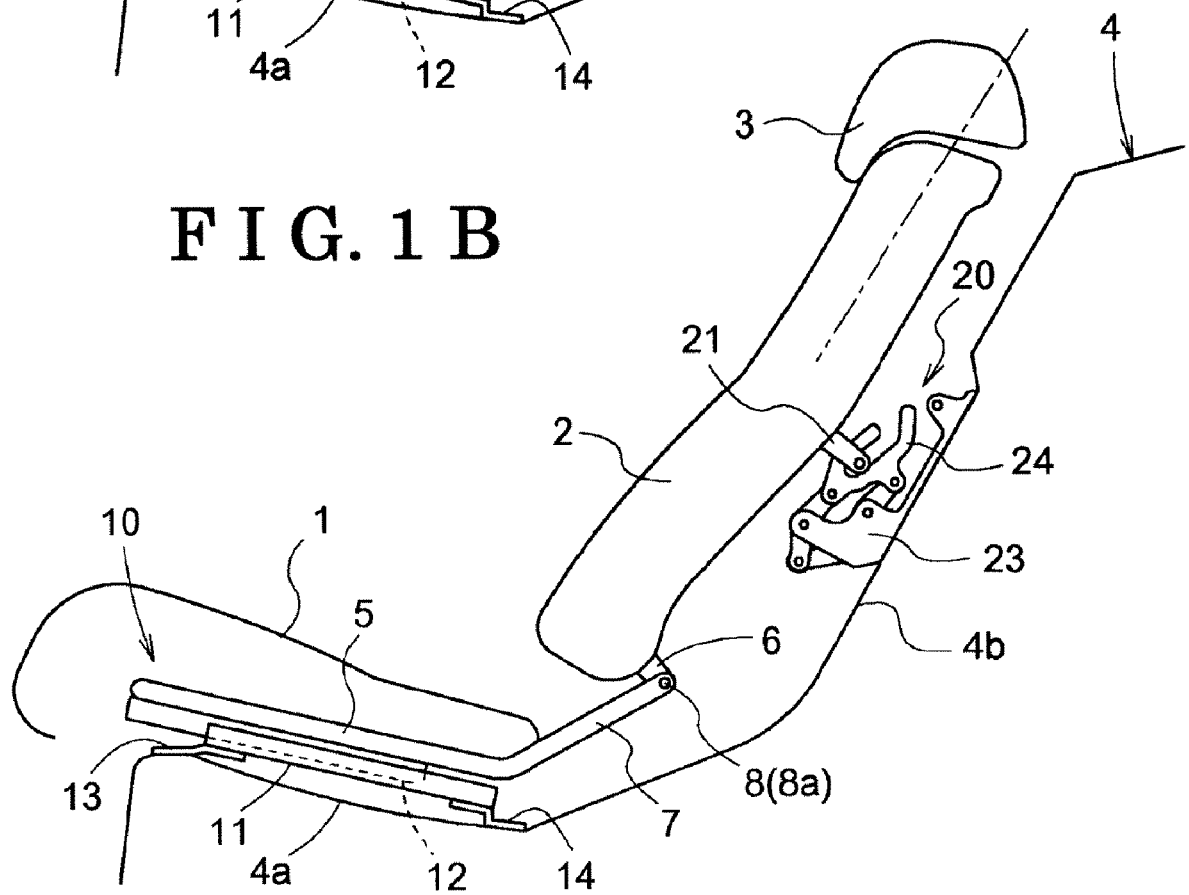

Namely, FIG. 1A illustrates the seating apparatus when the seat cushion 1 is adjusted to the most rear position relative to the vehicle body to which the seat cushion 1 can be moved. FIG. 1B illustrates the seating apparatus when the seat cushion 1 is adjusted to the most front position relative to the vehicle body to which the seat cushion 1 can be moved. As illustrated in the figures, when the seat cushion 1 is adjusted to the front side relative to the vehicle body, the seat back 2 further reclines relative to the seat cushion 1 compared to the angle of the inclination before the adjustment. Also, the further the seat cushion moves forward, the more the reclined angle the seat back 2 increases. On the other hand, the further the seat cushion moves backward, the more the angle, which moves toward the upright position, increases. This allows the seat back 2 to set the mounted position at the angle of the inclination according to the adjusted position of the seat cushion 1.

When the seat cushion 1 is adjusted to the most front position relative to the vehicle body, the reclined angle of the seat back 2 increases, and the load caused by weight of the passenger and acting on the seat back 2 increases. In this case, the line of action L of the load W, which is applied to the left and right receiving portions 22 from each connecting axial portion 21a of the left and right contacting members 21 of the seat back 2, is positioned between the pivoting portions 24c and 24b of the facing link member 24. Thus, even if a large load W is applied to the receiving portions 22, the load W is dispersed between the first link member 25 and the second link member 26 and then the seat back 2 is stably supported by the left and right receiving portions 22.

If the mounted position of the seat back 2 determined according to positioning adjustment of the seat cushion 1, which moves backward and forward, is still not suitable for the body frame of the passenger, the electric motor 41 of the adjustment mechanism 40 will be driven. Then, the adjustment mechanism 40 starts operating, and each facing link member 24 of the pair of left and right parallel link mechanisms 27 is positioned to be close to or to be spaced away from the fixed link members 23. As a result, the seat back 2 is swung in the forward or backward direction of the vehicle around the pivot shaft center 8a via the pair of left and right contacting members 21 and thus the inclination of the seat back 2 relative to the seat cushion 1 is changed.

At this time, the seat back 2 is adjusted to the stroke end, the first link member 25 and the second link member 26 may reach the vicinity of a dead point. However, in each second parallel link mechanism 36, when the seat back 2 is adjusted to the other stroke end, the extended portion 26b of the second link member 26 is swung by the operating shaft 42 and the second facing link member 35 swings the extended portion 25b of the first link member 25. Thus, the adjustment mechanism 40 operates the second parallel link mechanism 36 to guide the first link member 25 so as to swing in a predetermined direction without swinging in a reverse direction beyond the dead point. At the same time, the adjustment mechanism 40 operates the parallel link mechanism 27 smoothly to adjust the inclination of the seat back 2.

Another Embodiment

In the above-described embodiment, the long hole 24a is provided at the facing link member 24 and the connecting axial portion 21a is provided at the contacting member 21. However, instead of this structure, the long hole may be provided at the contacting member 21 and the connecting axial portion may be provided at the facing link member 24. In this case, it is still possible to achieve the purpose of the invention disclosed in Claim 1.

In the above-described embodiment, the connecting axial portion 21a penetrates through the long hole 24a. Instead of the long hole 24a, a recessed groove, into which an end portion of the connecting axial portion 21a is rotatably and slidably fitted, may be employed to achieve the purpose of the invention. In this case, the connecting axial portion 21a does not penetrate through the groove. Therefore, the long hole 24a and the recessed groove are generally called a long groove 24a.

In the above-described embodiment, the adjustment mechanism 40 is operated so that the facing link member 24 is positioned to be close to or to be spaced away from the fixed link member 23 by the driving force of the electric motor 41. Instead of the above-structure, the facing link member 24 may be positioned to be close to or to be spaced away from the fixed link member 23 by a human-caused operational force. Also, the second link member 26 is directly operated by the operating shaft 42 in the above-described embodiment. However, the structures in which the first link member 25, instead of the second link member 26, is directly operated by the operating shaft, may be employed. It is possible to achieve the purpose of the invention regardless whether the mechanical drive mechanism or human-caused mechanism is employed. Further, it is still possible to achieve the purpose of the invention regardless of which members of the parallel link mechanism 27 receive the operational force.

According to the above-described structure, when the seat cushion is moved in the forward and backward direction of the vehicle, the lower portion of the seat back is moved in the forward and backward direction by the seat cushion. In conjunction with the movement, the connecting axial portion slidably moves along the long groove and the seat back is moved. For example, when the position of the seat cushion is adjusted to the front side relative to the vehicle body, the seat back is reclined relative to the seat cushion in conjunction with the movement of the seat cushion. Conversely, when the seat cushion is adjusted to the rear side relative to the vehicle body, the seat back is moved toward the upright position relative to the seat cushion in conjunction with the movement of the seat cushion. When the adjustment mechanism is operated, the facing link member is positioned to be close to or to be spaced away from the fixed link member, and the contacting member is moved in the forward and backward direction of the vehicle via the long groove and the connecting axial portion. Thus, the seat back is reclined or moved toward the upright position relative to the seat cushion with the pivot shaft center serving as the supporting point.

The seating apparatus structured as mentioned above allows to the seat cushion and the seat back to be promptly adjusted to the desired position and the desired inclination respectively by adjusting the seat cushion and operating the adjustment mechanism. Therefore, it is possible to obtain the comfortable seating position according to the body frame of the passenger.

The wider the adjustable range for the inclination of the seat back adjusted by the adjustment mechanism becomes, the easier the first and second link members reach the vicinity of the dead point when the seat back reaches the stroke end. However, according to the above structure, when the seat back is adjusted to move from the stroke end to the other stroke end, the second parallel link mechanism does not reach the dead point. Thus, the second parallel link mechanism performs the operation for guiding the first and second link members to prevent the members from swinging in a reverse direction beyond the dead point. Thus, it is possible to obtain a high quality seating apparatus, which adjusts the inclination of the seat back in a wider range for smooth adjustment.

When the seat cushion is adjusted to the most front position relative to the vehicle body, the seat back is positioned at the most reclined position and the weight of the passenger is likely to be applied to the seat back. That is, the large load is applied to the receiving portions. In this case, the load applied to each receiving portion from the seat back is dispersed between the first link member and the second link member. Thus, it is possible to obtain a high quality seating apparatus in which the seat back is securely supported for stable use.

The principles, of the preferred embodiments and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A seating apparatus for a vehicle, comprising:
a seat cushion having an adjustable mount to move in a forward and backward direction of a vehicle;

a seat back pivotally connected, at a lower end portion thereof, to a rear end portion of the seat cushion for reclining in conjunction with a forward movement of the seat cushion and moving toward an upright position in conjunction with a backward movement of the seat cushion, and wherein in addition to movement for reclining and toward upright in conjunction with forward and backward movement of the seat cushion, the seat back is separately movable for adjusting inclination of the seat back independent of movement of the seat cushion;

a contacting member provided at a backside of the seat back;

a receiving portion provided at a vehicle body and supporting the contacting member for reclining the seat back in conjunction with the forward movement of the seat cushion and moving the seat back toward an upright position in conjunction with the backward movement of the seat cushion, the receiving portion including a parallel link mechanism having:
a fixed link member fixed to the vehicle body;
a facing link member facing the fixed link member;
a first link member connecting the fixed link member to the facing link member;
a second link member connecting the fixed link member to the facing link member;
a long groove provided at one of the facing link member and the contacting member;
a connecting axial portion provided at the other one of the facing link member and the contacting member and moving in conjunction with the long groove when the seatback is inclined;
where in the long groove allowing the seat back to be inclined by sliding movement of the connection axial portion when the seat back is inclined in conjunction with back and forth movement of the seat cushion,
an adjustment mechanism adjusting an inclination of the seat back when the parallel link mechanism positions the facing link member to be close to, or to be spaced away from, the fixed link member by acting on the inclining movement of the seat back independent of the movement of the seat cushion.

2. A seating apparatus for a vehicle according to claim 1, further comprising:
a second parallel link mechanism, wherein the first link member of the parallel link mechanism and the second link member of the parallel link mechanism extend from respective connecting portions connected with the fixed link member of the parallel link mechanism to an opposite side of the facing link member of the parallel link mechanism, and wherein an extended portion of each of the first link member and the second link member are connected to each other by a second facing link member of the second link mechanism.

3. A seating apparatus for a vehicle, comprising:
a seat cushion adapted to be adjusted to move in a forward and backward direction of a vehicle;
a seat back pivotally connected, at a lower end portion thereof, to a rear end portion of the seat cushion for reclining in conjunction with a forward movement of the seat cushion and moving toward an upright position in conjunction with a backward movement of the seat cushion;
a contacting member provided at a backside of the seat back;
a receiving portion provided at a vehicle body and supporting the contacting member for reclining the seat back in conjunction with the forward movement of the seat cushion and moving the seat back toward an upright position in conjunction with the backward movement of the seat cushion, the receiving portion including a parallel link mechanism having:
a fixed link member fixed to the vehicle body;
a facing link member facing the fixed link member;
a first link member connecting the fixed link member to the facing link member;
a second link member connecting the fixed link member to the facing link member;
a long groove provided at one of the facing link member and the contacting member;
a connecting axial portion provided at the other one of the facing link member and the contacting member and sliding in the long groove when the seatback is moved;
an adjustment mechanism acting on the parallel link mechanism and adjusting an inclination of the seat back by positioning the facing link member to be close to, or to be spaced away from the fixed link member,
wherein a structure of the seating apparatus for the vehicle is designed so that the long groove is provided at the facing link member, the connecting axial portion is provided at the contacting member, a line of action of a load exerting on the receiving portion from the connecting axial portion is positioned between a pivoting portion of the facing link member with the first link member and a pivoting portion of the facing link member with the second link member when the seat cushion is moved to a most front position.

4. A seating apparatus for a vehicle according to claim 2, wherein a structure of the seating apparatus for the vehicle is designed so that the long groove is provided at the facing link member, the connecting axial portion is provided at the contacting member, a line of action of a load exerting on the receiving portion from the connecting axial portion is positioned between a pivoting portion of the facing link member with the first link member and a pivoting portion of the facing link member with the second link member when the seat cushion is moved to a most front position.

5. A seating apparatus for a vehicle, comprising:
a seat cushion adapted to be adjusted to move in a forward and backward direction of a vehicle;
a seat back pivotally connected, at a lower end portion thereof, to a rear end portion of the seat cushion for reclining in conjunction with a forward movement of the seat cushion and moving toward an upright position in conjunction with a backward movement of the seat
a contacting member provided at a backside of the seat back;
a receiving portion provided at a vehicle body and supporting the contacting member for reclining the seat back in conjunction with the forward movement of the seat cushion and moving the seat back toward an upright position in conjunction with the backward movement of the seat cushion, the receiving portion including a parallel link mechanism having:
a fixed link member fixed to the vehicle body;
a facing link member facing the fixed link member;
a first link member connecting the fixed link member to the facing link member;
a second link member connecting the fixed link member to the facing link member;
a long groove provided at one of the facing link member and the contacting member;

a connecting axial portion provided at the other one of the facing link member and the contacting member and sliding in the long groove when the seatback is moved;

an adjustment mechanism acting on the parallel link mechanism and adjusting an inclination of the seat back by positioning the facing link member to be close to, or to be spaced away from, the fixed link member, wherein the long groove is provided with an opening communicating with an exterior portion of the facing link member at an end portion located at an upper side of the seat back, and the connecting axial portion is fitted into the long groove from the opening.

6. A seating apparatus for a vehicle according to claim 2, wherein the long groove is provided with an opening communicating with an exterior portion of the facing link member at an end portion located at an upper side of the seat back, and the connecting axial portion is fitted into the long groove from the opening.

7. A seating apparatus for a vehicle according to claim 1, wherein the adjustment mechanism includes:

an operating shaft connected to the second link member in the parallel link mechanism;

an operating arm connected to an end side of the operating shaft so as to be unitarily rotatable;

a decelerating mechanism having a feed screw shaft connected, at an end thereof, to the operating arm.

8. A seating apparatus for a vehicle according to claim 2, wherein the adjustment mechanism includes:

an operating shaft connected to the second link member in the parallel link mechanism;

an operating arm connected to an end side of the operating shaft so as to be unitarily rotatable;

a decelerating mechanism having a feed screw shaft connected, at an end thereof, to the operating arm.

9. A seating apparatus for a vehicle according to claim 3, wherein the adjustment mechanism includes:

an operating shaft connected to the second link member in the parallel link mechanism;

an operating arm connected to an end side of the operating shaft so as to be unitarily rotatable;

a decelerating mechanism having a feed screw shaft connected, at an end thereof to the operating arm.

10. A seating apparatus for a vehicle according to claim 5, wherein the adjustment mechanism includes:

an operating shaft connected to the second link member in the parallel link mechanism;

an operating arm connected to an end side of the operating shaft so as to be unitarily rotatable;

a decelerating mechanism having a feed screw shaft connected, at an end thereof, to the operating arm.

* * * * *